US011479196B2

(12) United States Patent
Roh

(10) Patent No.: US 11,479,196 B2
(45) Date of Patent: Oct. 25, 2022

(54) DEVICE AND METHOD FOR CONTROLLING AIRBAG

(71) Applicant: HYUNDAI MOBIS CO., LTD., Seoul (KR)

(72) Inventor: Tae Ho Roh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 95 days.

(21) Appl. No.: 16/921,195

(22) Filed: Jul. 6, 2020

(65) Prior Publication Data

US 2021/0009061 A1    Jan. 14, 2021

(30) Foreign Application Priority Data

Jul. 8, 2019   (KR) .......................... 10-2019-0082007

(51) Int. Cl.
| | |
|---|---|
| *B60R 21/0134* | (2006.01) |
| *B60R 21/0132* | (2006.01) |
| *G08G 1/16* | (2006.01) |
| *G01S 13/931* | (2020.01) |
| *B60W 30/09* | (2012.01) |

(52) U.S. Cl.
CPC ...... *B60R 21/0134* (2013.01); *B60R 21/0132* (2013.01); *B60W 30/09* (2013.01); *G01S 13/931* (2013.01); *G08G 1/166* (2013.01); *B60R 2021/01322* (2013.01)

(58) Field of Classification Search
CPC ............ B60R 21/0134; B60R 21/0132; B60R 2021/01322; G01S 13/931; G08G 1/166
See application file for complete search history.

(56) References Cited

U.S. PATENT DOCUMENTS

| | | | | |
|---|---|---|---|---|
| 2009/0299578 | A1* | 12/2009 | Lucas ................... | B60R 21/013 701/46 |
| 2011/0231067 | A1* | 9/2011 | Itoga ................... | B60R 21/0134 701/46 |
| 2014/0277950 | A1* | 9/2014 | Kim ..................... | B60R 21/0134 701/45 |

* cited by examiner

*Primary Examiner* — Peter D Nolan
*Assistant Examiner* — Tarek Elarabi
(74) *Attorney, Agent, or Firm* — DLA Piper LLP (US)

(57) ABSTRACT

Disclosed is a device for controlling an airbag, which includes a first sensor unit configured to detect surrounding vehicle information using at least one sensor, a second sensor unit configured to detect collision information of an ego-vehicle using at least one sensor, and a controller configured to calculate a target relative velocity and time to collision (TTC) based on sensing information detected by the first sensor unit, determine a collision risk of the ego-vehicle based on the calculated target relative velocity and TTC, maintain a threshold for airbag deployment by default or adjust the threshold, based on a result of the determination of the collision risk of the ego-vehicle, compare the maintained or adjusted threshold with the collision information received from the second sensor unit, and control whether to deploy the airbag based on whether the collision information is the maintained or adjusted threshold or more.

6 Claims, 6 Drawing Sheets

FIG.1
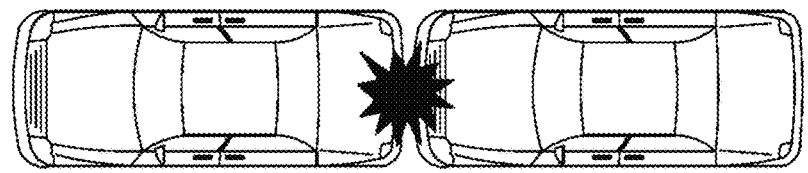
(a)
(b)
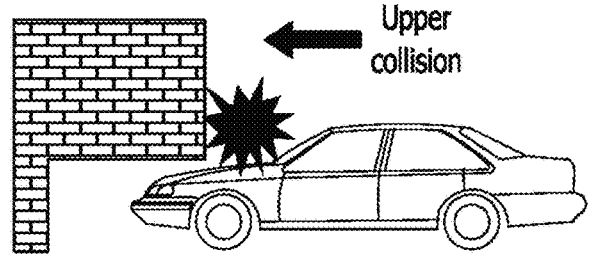
(c)

DEVICE AND METHOD FOR CONTROLLING AIRBAG

CROSS-REFERENCE TO RELATED APPLICATION

This application claims priority from and the benefit of Korean Patent Application No. 10-2019-0082007, filed on Jul. 8, 2019, which is hereby incorporated by reference for all purposes as if set forth herein.

BACKGROUND

Field

Exemplary embodiments of the present disclosure relate to a device and method for controlling an airbag, and more particularly, to a device and method for controlling an airbag, which can improve airbag deployment performance for a field accident by adjusting an airbag deployment threshold based on a predicted collision risk of a vehicle.

Discussion of the Background

In general, an airbag system for a vehicle is installed within the vehicle, and is installed for the purpose of protecting, against an impact, an occupant seated in a driver's seat or passenger seat when a collision accident occurs. The airbag system for a vehicle basically includes a cushion for protecting an occupant and an inflator for supplying gas to the cushion, and also includes a dual inflator that enables low pressure and high pressure deployment of the cushion.

The airbag system calculates a collision severity based on information on the state of a vehicle upon collision, compares the collision severity with a threshold, that is, a criterion for airbag deployment, and controls the airbag to be deployed upon collision whose severity exceeds the threshold.

In this case, the collision severity may be calculated by taking into consideration an impulse detected by a front impact sensor (hereinafter referred to as an "FIS") mounted within an engine room and collision deceleration calculated by a longitudinal acceleration sensor and lateral acceleration sensor (hereinafter referred to as an "acceleration sensor") within the vehicle. The FIS is mounted within the engine room in order to early detect a front impact. The acceleration sensor is mounted at the center of gravity of the vehicle in order to determine an impact force.

Furthermore, an airbag control unit (ACU) (hereinafter referred to as "controller") of the airbag system determines whether to deploy the airbag based on collision deceleration detected by the acceleration sensor (e.g., longitudinal and lateral acceleration sensors) and the impulse detected by the FIS.

However, collision accidents occurring in actual fields include a rear-end collision (i.e., collision occurring because an ego-vehicle collides against the back of a vehicle ahead) (refer to (a) of FIG. 1), an angled collision (i.e., collision occurring at an angle between the front and the side) (refer to (b) of FIG. 1), and an upper collision (i.e., collision occurring over a hood due to a road facility positioned higher than the hood) (refer to (c) of FIG. 1), as illustrated in FIG. 1, in addition to a head-on collision. When collisions other than the head-on collision (i.e., the angled collision, the rear-end collision or the upper collision occurring at a place other than the place where a sensor mounting unit is located) occur, it is difficult to sense an accurate impulse corresponding to an actual impulse (i.e., there is a difference between the actual impulse and a sensing impulse sensed by the sensor).

Accordingly, as described above, upon collision accident occurring due to a difference between the actual impulse and the sensing impulse (i.e., actual impulse>sensing impulse), when the sensing impulse is smaller than a designated threshold on the basis of the sensing impulse, the controller (i.e., ACU) does not deploy the airbag. That is, when an impact in which a sensing impulse not corresponding to an actual impulse is detected occurs, the controller (i.e., ACU) simply determines whether to deploy an airbag based on the sensing impulse. Accordingly, there may be a problem in that the controller does not deploy the airbag even in a collision accident in which the airbag is to be deployed.

SUMMARY

Various embodiments are directed to the provision of a device and method for controlling an airbag, which can improve airbag deployment performance for a field accident by adjusting an airbag deployment threshold based on a predicted collision risk of a vehicle.

In an embodiment, a device for controlling an airbag may include a first sensor unit configured to detect surrounding vehicle information using at least one sensor, a second sensor unit configured to detect collision information of an ego-vehicle using at least one sensor, and a controller configured to calculate a target relative velocity and time to collision (TTC) based on sensing information detected by the first sensor unit, determine a collision risk of the ego-vehicle based on the calculated target relative velocity and TTC, maintain a threshold for airbag deployment by default or adjust the threshold, based on a result of the determination of the collision risk of the ego-vehicle, compare the maintained or adjusted threshold with the collision information received from the second sensor unit, and control whether to deploy the airbag based on whether the collision information is the maintained or adjusted threshold or more.

In an embodiment, the first sensor unit includes at least one of a camera, a radar and a lidar as active sensors.

In an embodiment, the controller may divide the collision risk into at least three sections and determine the collision risk. The three sections may include a non-collision section, a collision risk section, and a collision determination section.

In an embodiment, the collision information may include at least sensor acceleration information.

In an embodiment, the collision risk may mean a collision possibility. The three sections may be divided based on how short the TTC is and how high the target relative velocity is. The collision risk of the ego-vehicle may move to the collision determination section as the TTC is decreased and the target relative velocity is increased. The collision risk of the ego-vehicle may move from the collision risk section to the non-collision section when the TTC is increased and the target relative velocity is decreased through braking in the collision risk section, that is, a section before the collision risk enters the collision determination section.

In an embodiment, the controller may maintain a default threshold set by default for airbag deployment, when a current state of the ego-vehicle corresponds to the non-collision section.

In an embodiment, the controller may adjust the threshold for airbag deployment to a designated first threshold, when a current state of the ego-vehicle corresponds to the collision risk section and the collision risk section continues to be maintained.

In an embodiment, the controller may adjust the threshold for airbag deployment to a designated second threshold, when a current state of the ego-vehicle corresponds to the collision determination section.

In an embodiment, when the collision information is received from the second sensor unit after the threshold for airbag deployment is maintained or adjusted, the controller may compare the received collision information with the maintained or adjusted threshold and deploy the airbag when the collision information is the maintained or adjusted threshold or more.

In an embodiment, a method of controlling an airbag may include detecting, by a controller of a device for controlling an airbag, surrounding vehicle information of an ego-vehicle through a first sensor unit, detecting, by the controller, collision information of the ego-vehicle through a second sensor unit, calculating, by the controller, a target relative velocity and time to collision (TTC) based on sensing information detected by the first sensor unit, determining, by the controller, a collision risk of the ego-vehicle based on the calculated target relative velocity and TTC, maintaining, by the controller, a threshold for airbag deployment by default or adjusting the threshold, based on a result of the determination of the collision risk of the ego-vehicle, and comparing, by the controller, the maintained or adjusted threshold with the collision information received from the second sensor unit and controlling whether to deploy the airbag based on whether the collision information is the maintained or adjusted threshold or more.

In an embodiment, in the determining of the collision risk of the ego-vehicle, the controller may divide the collision risk into at least three sections and determines the collision risk. The three sections may include a non-collision section, a collision risk section, and a collision determination section.

In an embodiment, the collision risk may mean a collision possibility. The three sections may be divided based on how short the TTC is and how high the target relative velocity is. The collision risk of the ego-vehicle may move to the collision determination section as the TTC is decreased and the target relative velocity is increased. The collision risk of the ego-vehicle may move from the collision risk section to the non-collision section when the TTC is increased and the target relative velocity is decreased through braking in the collision risk section, that is, a section before the collision risk enters the collision determination section In an embodiment, when a current state of the ego-vehicle corresponds to the non-collision section, the controller may maintain a default threshold set by default for airbag deployment.

In an embodiment, when a current state of the ego-vehicle corresponds to the collision risk section and the collision risk section continues to be maintained, the controller may adjust the threshold for airbag deployment to a designated first threshold.

In an embodiment, when a current state of the ego-vehicle corresponds to the collision determination section, the controller may adjust the threshold for airbag deployment to a designated second threshold.

In an embodiment, when the collision information is received from the second sensor unit after the threshold for airbag deployment is maintained or adjusted, the controller may compare the received collision information with the maintained or adjusted threshold and deploy the airbag when the collision information is the maintained or adjusted threshold or more.

BRIEF DESCRIPTION OF THE DRAWINGS

FIG. 1 is an exemplary diagram for illustrating collision accidents in which an airbag is not deployed.

DETAILED DESCRIPTION OF THE ILLUSTRATED EMBODIMENTS

Figure 2:
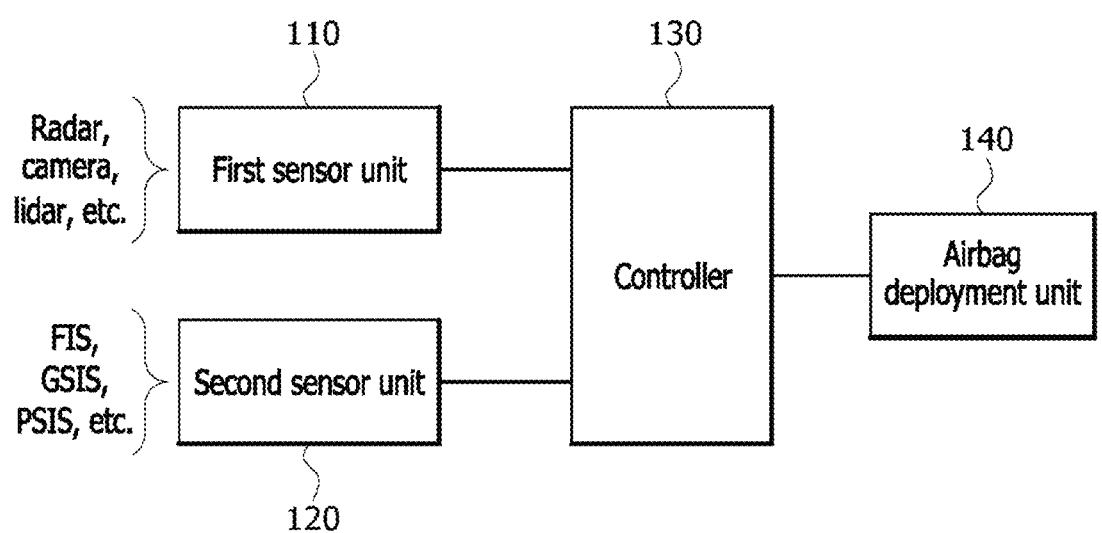
FIG. 2 is an exemplary diagram illustrating a schematic configuration of a device for controlling an airbag according to an embodiment of the present disclosure.

Hereinafter, a device and method for controlling an airbag will be described below with reference to the accompanying drawings through various exemplary embodiments.

The thickness of lines or the size of elements shown in the drawings in a process of describing this specification may have been exaggerated for the clarity of a description and for convenience' sake. Terms to be described below have been defined by taking into consideration their functions in the present disclosure, and may be different depending on a user or operator's intention or practice. Accordingly, such terms should be interpreted based on the overall contents of this specification.

FIG. 2 is an exemplary diagram illustrating a schematic configuration of a device for controlling an airbag according to an embodiment of the present disclosure.

As illustrated in FIG. 2, a device for controlling an airbag in an ego-vehicle according to the present embodiment includes a first sensor unit 110, a second sensor unit 120, a controller 130, and an airbag deployment unit 140.

The first sensor unit 110 includes an active sensor (e.g., a camera, a radar or a lidar) mounted on the ego-vehicle.

The second sensor unit 120 includes a passive sensor (e.g., acceleration sensor, FIS, G-Side Impact Sensor (acceleration type Side Impact Sensor) (hereinafter "GSIS") or Pressure Side Impact Sensor (hereinafter "PSIS") mounted on the ego-vehicle.

In a conventional technology, the controller 130 determines whether to deploy the airbag based on only information sensed through the second sensor unit 120.

Accordingly, if collisions other than a head-on collision (i.e., angled collision, rear-end collision or upper collision occurring at a place other than the place where a sensor mounting unit is positioned) occur, an accurate impulse corresponding to an actual impulse occurring in the ego-vehicle cannot be sensed (i.e., there is a difference between the actual impulse and a sensing impulse sensed by a sensor).

If an impact from which a sensing impulse not corresponding to an actual impulse occurring in an ego-vehicle is detected occurs as described above, as described above, the existing controller simply determines whether to deploy an airbag based on the sensing impulse. Accordingly, there may be a problem in that the airbag is not deployed even in a collision accident in which the airbag is to be deployed.

In order to solve the problem, the controller 130 according to the present embodiment calculates a target relative velocity and a time to collision (TTC) based on sensing information detected by the first sensor unit 110, and determines a collision risk based on the calculated target relative velocity and TTC. That is, the controller 130 predicts a collision (or collision possibility). In this case, the technical subject matter of the present embodiment does not lie in the calculation itself of the TTC, and thus a detailed description of the calculation of the TTC is omitted.

Furthermore, the controller 130 divides a collision risk (or collision possibility) into at least three sections (e.g., a non-collision section, a collision risk section, and a collision determination section) based on a result of the determination of the collision risk (i.e., a result of the prediction of the collision possibility). Furthermore, the controller 130 adjusts a threshold for airbag deployment based on a section to which an ego-vehicle now belongs among the divided three sections (e.g., the non-collision section, the collision risk section and the collision determination section).

Furthermore, the controller 130 compares the threshold for airbag deployment (i.e., the adjusted threshold), adjusted based on the section to which the ego-vehicle now belongs, with collision information (e.g., sensor acceleration information) input when the ego-vehicle collides. When the collision information (e.g., sensor acceleration information) is the adjusted threshold or more as a result of the comparison, the controller 130 deploys the airbag through the airbag deployment unit 140.

Figure 3:
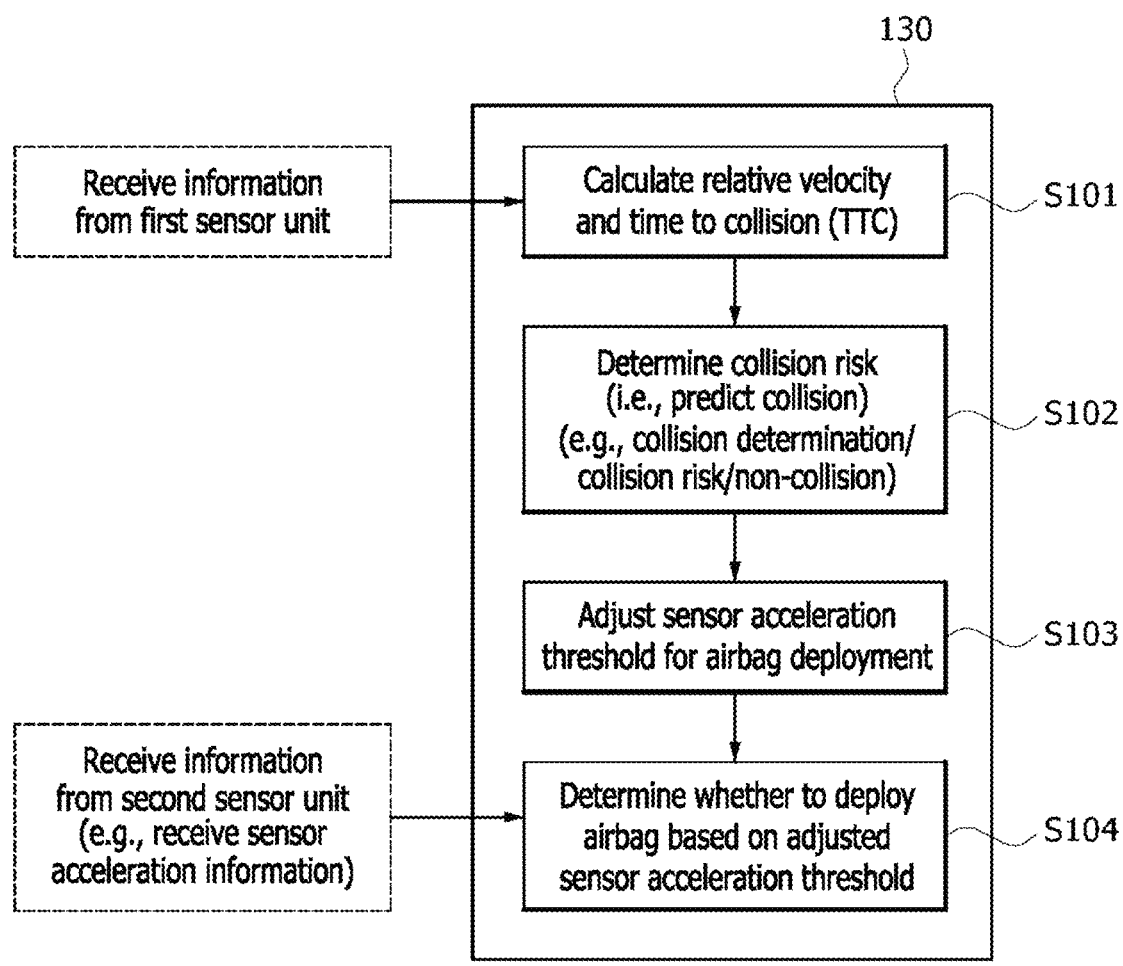
FIG. 3 is an exemplary diagram for illustrating a more detailed operation of a controller illustrated in FIG. 2.

FIG. 3 is an exemplary diagram for illustrating a more detailed operation of the controller 130 illustrated in FIG. 2.

Referring to FIG. 3, the controller 130 receives sensing information (e.g., information on the distance between the ego-vehicle and a target, information on the location of the target or information on the driving velocity of the ego-vehicle) detected by the first sensor unit 110, and calculates a target relative velocity and TTC based on the received sensing information (S101).

Furthermore, the controller 130 determines a collision risk based on the calculated target relative velocity and TTC. In this case, the collision risk means a collision possibility. The controller 130 predicts the collision possibility (S102).

At this time, the controller 130 divides the collision risk (or collision possibility) into at least three sections (e.g., non-collision section, collision risk section and collision determination section) based on a result of the determination of the collision risk (i.e., a result of the prediction of the collision possibility).

Furthermore, the controller 130 adjusts a threshold for airbag deployment (e.g., sensor acceleration threshold for airbag deployment) based on a section to which the ego-vehicle now belongs among the divided three sections (e.g., non-collision section, collision risk section and collision determination section) (S103).

Furthermore, when the ego-vehicle collides, the controller 130 compares collision information (e.g., sensor acceleration information), received from the second sensor unit 120, with the threshold (i.e., threshold adjusted for airbag deployment) adjusted based on the collision risk (or collision possibility) section to which the ego-vehicle now belongs. The controller 130 determines whether to deploy the airbag based on whether the collision information (e.g., sensor acceleration information) is the adjusted threshold (i.e., threshold adjusted for airbag deployment) or more (S104).

Figure 4:
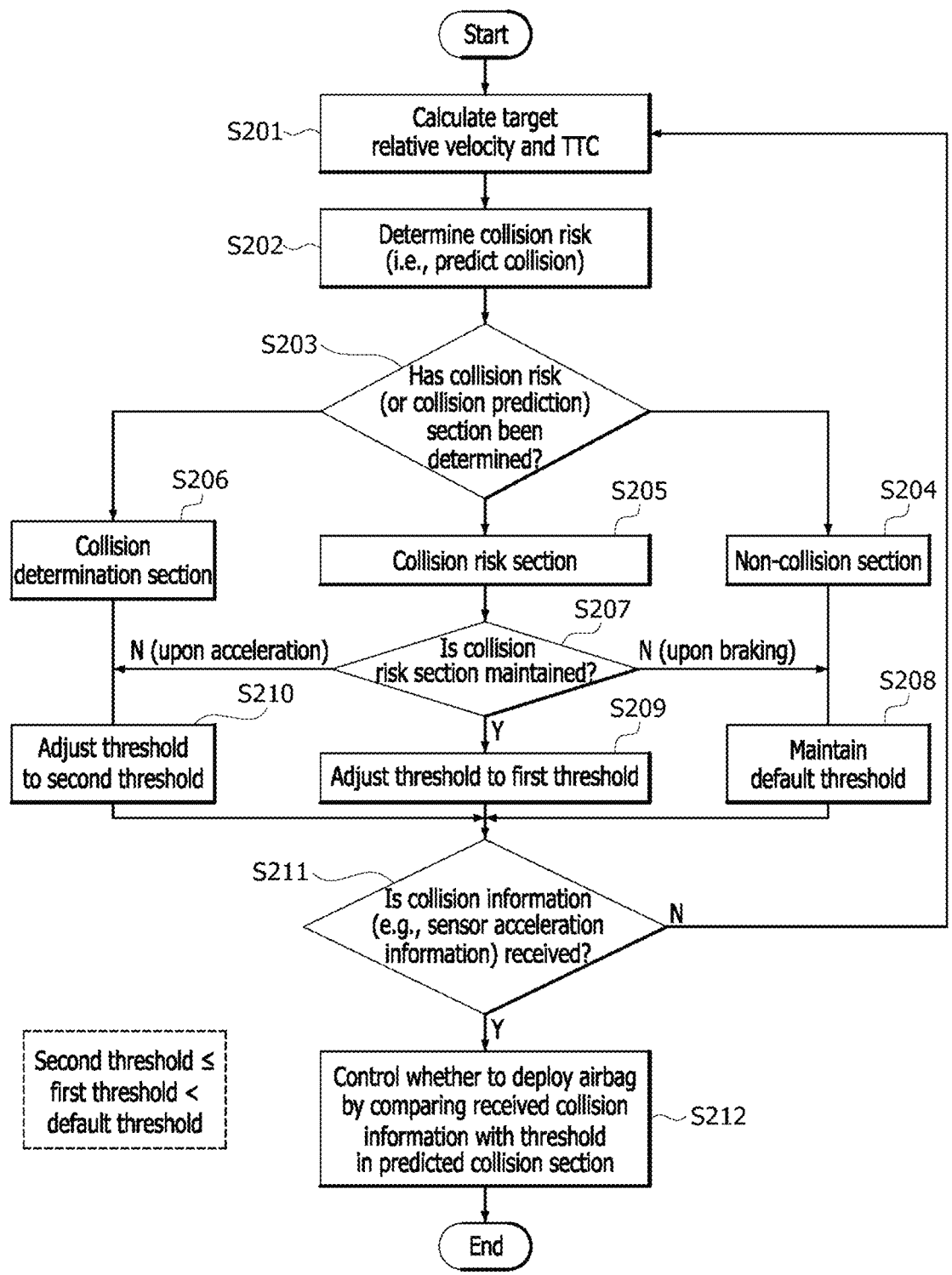
FIG. 4 is a flowchart for describing a method of controlling an airbag according to an embodiment of the present disclosure.

FIG. 4 is a flowchart for describing a method of controlling an airbag according to an embodiment of the present disclosure.

Referring to FIG. 4, the controller 130 of the device for controlling an airbag receives sensing information (e.g., information on the distance between the ego-vehicle and a target, information on the location of the target or information on the driving velocity of the ego-vehicle) detected by the first sensor unit 110, and calculates a target relative velocity and TTC based on the received sensing information (S201).

Furthermore, the controller 130 determines a collision risk based on the calculated target relative velocity and TTC (S202).

In this case, determining the collision risk means predicting a collision possibility.

Accordingly, the controller 130 divides the collision risk (or collision possibility) into at least three sections (e.g., non-collision section, collision risk section and collision determination section) based on a result of the determination of the collision risk (i.e., a result of the prediction of the collision possibility) (refer to FIG. 5), and determines a section to which the ego-vehicle now belongs among the three sections (S203).

Figure 5:
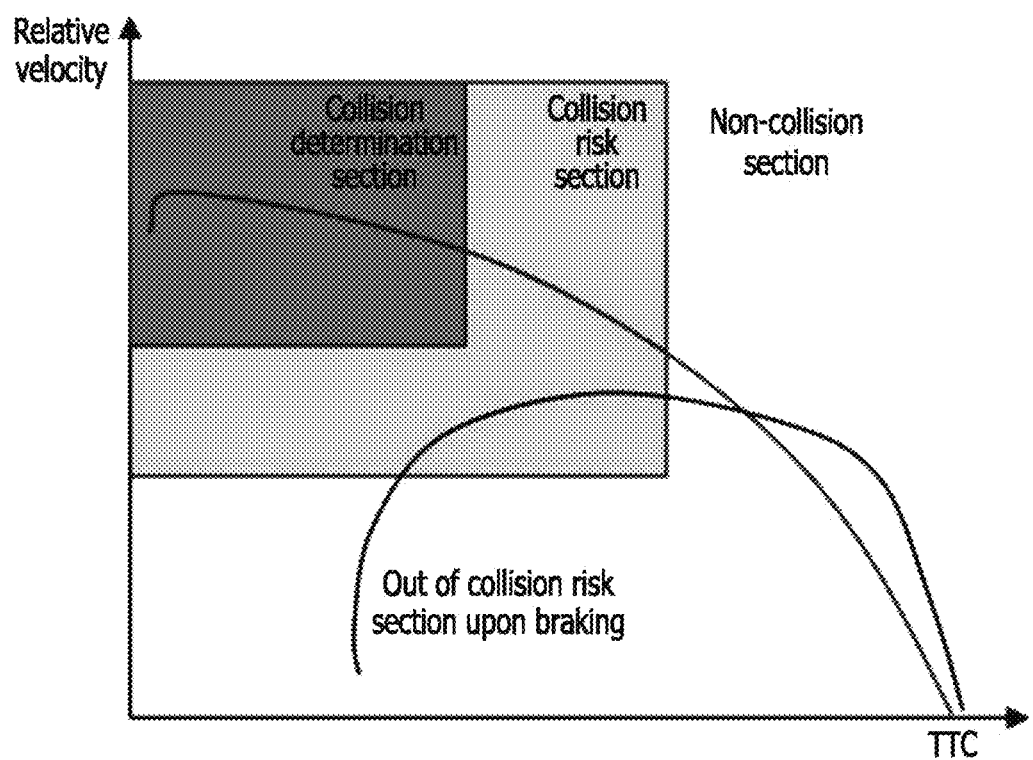
FIG. 5 is an exemplary diagram for illustrating three sections divided based on a collision possibility of an ego-vehicle in FIG. 4.

FIG. 5 is an exemplary diagram for illustrating the three sections divided based on the collision possibility of the ego-vehicle in FIG. 4. Referring to FIG. 5, the collision risk (or collision possibility) is divided into the non-collision section, the collision risk section, and the collision determination section based on how short a TCC is and how high a target relative velocity is. In this case, as the TTC is decreased and the target relative velocity is increased, the collision risk (or collision possibility) of the ego-vehicle may move to the collision determination section. When the TTC is increased and the target relative velocity is decreased through braking in the collision risk section, that is, a section before the collision risk enters the collision determination section, the collision risk (or collision possibility) may move from the collision risk section to the non-collision section.

If, as a result of the determination at S203, a current state of the ego-vehicle corresponds to the non-collision section (S204), the controller 130 maintains a default threshold (i.e., threshold set by default for airbag deployment) (S208).

If, as a result of the determination at S203, the current state of the ego-vehicle corresponds to the collision risk section (S205) and the collision risk section continues to be maintained (Yes at S207), the controller 130 adjusts a threshold for airbag deployment to a designated first threshold (S209).

If, as a result of the determination at S203, the current state of the ego-vehicle corresponds to the collision determination section (S206), the controller 130 adjusts the threshold for airbag deployment to a designated second threshold (S210).

In this case, the second threshold may have a value smaller than or equal to the first threshold. The first threshold has a value smaller than the default threshold (refer to FIG. 6).

Figure 6:
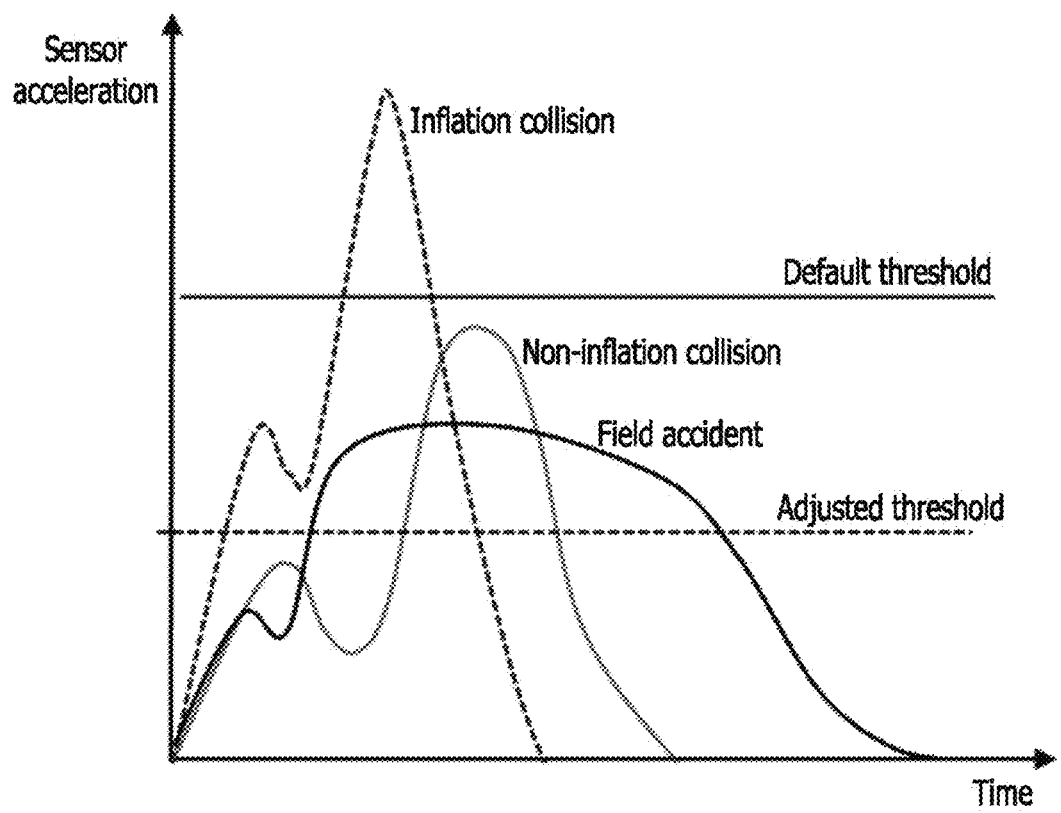
FIG. 6 is an exemplary diagram for illustrating a method of determining whether to deploy an airbag by comparing a default threshold or adjusted threshold for airbag deployment with collision information in FIG. 4.

FIG. 6 is an exemplary diagram for illustrating a method of determining whether to deploy an airbag by comparing a default threshold or adjusted threshold for airbag deployment with collision information in FIG. 4. In this case, although not specifically illustrated in FIG. 6, two or more adjusted thresholds (e.g., first threshold and second threshold) may be set.

If the current state of the ego-vehicle does not continue to maintain the collision risk section and the collision risk (or collision possibility) of the ego-vehicle moves to the non-collision section through braking (No (upon braking) in S207), the controller 130 may maintain the default threshold (S208). In contrast, if the collision risk (or collision possibility) of the ego-vehicle moves to the collision determination section through acceleration (Yes (upon acceleration) in S207), the controller 130 may adjust the threshold for airbag deployment to the designated second threshold (S210).

When collision information (e.g., sensor acceleration information) is received from the second sensor unit 120 (Yes in S211) after the threshold for airbag deployment is maintained or adjusted as described above, the controller 130 compares the received collision information with the maintained or adjusted threshold (refer to FIG. 6), and controls whether to deploy the airbag based on whether the collision information (e.g., sensor acceleration information) is the maintained or adjusted threshold (i.e., threshold maintained or adjusted for airbag deployment) or more (S212).

For example, as illustrated in FIG. 6, if a threshold is adjusted low, the controller 130 can improve the safety of a user for a collision accident by deploying an airbag although collision information (e.g., sensor acceleration information) received from the second sensor unit 120 is lower than (or smaller than) the existing default threshold.

As described above, the present embodiment has an effect in that it can improve airbag deployment performance for a field accident by adjusting an airbag deployment threshold based on a predicted collision risk of a vehicle.

The present disclosure has been described above based on the embodiments illustrated in the accompanying drawings, but the embodiments are merely illustrative. A person having ordinary skill in the art to which the present disclosure pertains will understand that various modifications and other equivalent embodiments are possible from the embodiments. Accordingly, the technical scope of protection of the present disclosure should be determined by the following claims. Furthermore, an implementation described in this specification may be realized as a method or process, apparatus, software program, data stream or signal, for example. Although the present disclosure has been discussed only in the context of a single form of implementation (e.g., discussed as only a method), a discussed characteristic may also be implemented in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A device for controlling an airbag, comprising:
   a first sensor unit configured to detect surrounding vehicle information using at least a first sensor;
   a second sensor unit configured to detect collision information of an ego-vehicle using at least a second sensor; and
   a controller configured to:
   calculate a target relative velocity and time to collision (TTC) based on sensing information detected by the first sensor unit;
   determine a collision risk of the ego-vehicle based on the calculated target relative velocity and TTC;
   divide the collision risk into at least three sections comprising a non-collision section, a collision risk section, and a collision determination section, wherein the collision risk section is a section before the collision risk enters the collision determination section, and wherein:
   the collision risk of the ego-vehicle moves to the collision determination section as the TTC is decreased and the target relative velocity is increased, and
   the collision risk of the ego-vehicle moves from the collision risk section to the non-collision section when the TTC is increased and the target relative velocity is decreased through braking;
   maintain a default threshold for airbag deployment when a current state of the ego-vehicle corresponds to the non-collision section;
   adjust the threshold for airbag deployment to a designated first threshold, when the current state of the ego-vehicle corresponds to the collision risk section and the collision risk section continues to be maintained;
   adjust the threshold for airbag deployment to a designated second threshold, when a current state of the ego-vehicle corresponds to the collision determination section; and
   compare the maintained or adjusted threshold with the collision information received from the second sensor unit, and control whether to deploy the airbag based on whether the collision information is the maintained or adjusted threshold or more.

2. The device of claim 1, wherein the first sensor unit comprises at least one of a camera, a radar and a lidar as active sensors.

3. The device of claim 1, wherein the collision information comprises at least sensor acceleration information.

4. The device of claim 1, wherein, when the collision information is received from the second sensor unit after the threshold for airbag deployment is maintained or adjusted, the controller
   compares the received collision information with the maintained or adjusted threshold, and
   deploys the airbag when the collision information is the maintained or adjusted threshold or more.

5. A method of controlling an airbag, comprising:
   detecting, by a controller of a device for controlling an airbag, surrounding vehicle information of an ego-vehicle through a first sensor unit;
   detecting, by the controller, collision information of the ego-vehicle through a second sensor unit;
   calculating, by the controller, a target relative velocity and time to collision (TTC) based on sensing information detected by the first sensor unit;
   determining, by the controller, a collision risk of the ego-vehicle based on the calculated target relative velocity and TTC;
   dividing, by the controller, the collision risk into at least three sections comprising a non-collision section, a collision risk section, and a collision determination section, wherein the collision risk section is a section before the collision risk enters the collision determination section, and wherein:

the collision risk of the ego-vehicle moves to the collision determination section as the TTC is decreased and the target relative velocity is increased, and the collision risk of the ego-vehicle moves from the collision risk section to the non-collision section when the TTC is increased and the target relative velocity is decreased through braking;

maintaining, by the controller, a default threshold for airbag deployment when a current state of the ego-vehicle corresponds to the non-collision section;

adjusting, by the controller, the threshold for airbag deployment to a designated first threshold, when the current state of the ego-vehicle corresponds to the collision risk section and the collision risk section continues to be maintained;

adjusting, by the controller, the threshold for airbag deployment to a designated second threshold, when a current state of the ego-vehicle corresponds to the collision determination section; and comparing, by the controller, the maintained or adjusted threshold with the collision information received from the second sensor unit and controlling whether to deploy the airbag based on whether the collision information is the maintained or adjusted threshold or more.

6. The method of claim 5, wherein when the collision information is received from the second sensor unit after the threshold for airbag deployment is maintained or adjusted, the controller compares the received collision information with the maintained or adjusted threshold and deploys the airbag when the collision information is the maintained or adjusted threshold or more.

\* \* \* \* \*